(12) United States Patent
Shinjo

(10) Patent No.: US 6,822,832 B2
(45) Date of Patent: Nov. 23, 2004

(54) THIN FILM MAGNETIC HEAD AND METHOD OF MANUFACTURING THE SAME

(75) Inventor: Yasuhiko Shinjo, Kanagawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 85 days.

(21) Appl. No.: 10/101,347

(22) Filed: Mar. 20, 2002

(65) Prior Publication Data

US 2002/0163758 A1 Nov. 7, 2002

(30) Foreign Application Priority Data

Mar. 22, 2001 (JP) .................................. P.2001-081933

(51) Int. Cl.[7] .............................................. G11B 5/127
(52) U.S. Cl. ...................................................... 360/126
(58) Field of Search ................................ 360/126, 317, 360/318; 75/255

(56) References Cited

U.S. PATENT DOCUMENTS

| | | | |
|---|---|---|---|
| 6,151,193 A | * 11/2000 | Terunuma et al. | 360/126 |
| 6,163,442 A | * 12/2000 | Gill et al. | 360/317 |
| 6,353,511 B1 | * 3/2002 | Shi et al. | 360/126 |
| 6,432,159 B1 | * 8/2002 | Saito et al. | 75/255 |
| 6,507,464 B1 | * 1/2003 | Ohashi et al. | 360/317 |
| 6,525,904 B1 | * 2/2003 | Sasaki | 360/126 |
| 6,549,369 B1 | * 4/2003 | Masuda et al. | 360/126 |
| 6,597,543 B1 | * 7/2003 | Saitho et al. | 360/317 |

* cited by examiner

Primary Examiner—Tianjie Chen
(74) Attorney, Agent, or Firm—Whitham, Curtis & Christofferson, P.C.

(57) ABSTRACT

A non-magnetic layer is laminated on a lower magnetic layer. A first upper magnetic layer is formed on the non-magnetic layer so as to form a magnetic core together with the lower magnetic layer and the non-magnetic layer. The first upper magnetic layer has a first saturation magnetic flux density and a first magnetostriction constant. An insulation layer is formed on the non-magnetic layer. A thin film coil is provided in the insulation layer. A second upper magnetic layer is formed on the insulation layer so as to be at least above the thin film coil. The second upper magnetic layer has a second saturation magnetic flux density and a second magnetostriction constant. The first saturation magnetic flux density is higher than the second saturation magnetic flux density. The second magnetostriction constant is lower than the first magnetostriction constant.

10 Claims, 3 Drawing Sheets

THIN FILM MAGNETIC HEAD AND METHOD OF MANUFACTURING THE SAME

BACKGROUND OF THE INVENTION

The present invention relates to a thin film magnetic head comprising a pair of magnetic layers; a non-magnetic layer serving as a magnetic gap and a thin film coil which are provided between the magnetic layers, and to a method of manufacturing such a thin film magnetic head.

Hitherto, a thin film magnetic head manufactured like a thin film by using various kinds of thin film forming techniques has been utilized as a magnetic head for recording signals on and reproducing signals from a magnetic recording medium, such as a magnetic tape and a magnetic disk. Such a thin film magnetic head is, for example, what is called an inductive thin-film magnetic head enabled to perform both the recording and reproducing of magnetic signals on a magnetic recording medium.

As illustrated in, for example, FIG. 5, in the inductive thin film magnetic head, a non-magnetic layer 115 formed like a thin film from a magnetic material is laminated on a lower magnetic layer 110 formed like a thin film from a magnetic material, as illustrated in, for example, FIG. 5. An insulating layer 111 is formed on the non-magnetic layer 115 by performing a high-temperature baking process on a photoresist. A thin film coil 112 is formed in this insulating layer 111 on the non-magnetic layer 115. Further, an upper magnetic layer 113 formed like a thin film from a magnetic material on the insulating layer 111. Furthermore, the lower magnetic layer 110 and the upper magnetic layer 113 are connected to each other at a winding center of the thin film coil 112, so as to constitute a magnetic core. Further, the non-magnetic layer 115 serves as a magnetic gap G of the magnetic core on a head face 114 opposing to a magnetic recording medium.

Meanwhile, when the upper magnetic layer 113 is formed in the aforementioned thin film magnetic head, a plating method, for instance, an electroplating method is used. The use of such a plating method has an advantage in that the upper magnetic layer 113 can be formed even at a slope portion indicated by a part B circled in FIG. 5 in such a manner as to have a uniform film thickness distribution.

However, in the case of forming an upper magnetic layer 113 by using the plating method, there has occurred a problem that the composition of the magnetic material becomes non-uniform in the vicinity of a magnetic gap indicated by a part C circled in FIG. 5. Thus, there have occurred other problems that the saturation magnetic flux density is lowered at this position, that consequently, the magnetic characteristics at the magnetic core are deteriorated, and that the recording and reproducing of weak magnetic signals cannot be favorably performed.

Further, when a sputtering method is used for forming the upper magnetic layer 113, the entire upper magnetic layer 113 can be formed in such a way as to have a uniform composition. The saturation magnetic flux density can be made to be uniform.

However, the sputtering method is a film forming method fundamentally having anisotropy. Therefore, this sputtering method has a drawback in that the film thickness decreases at the slope portion indicated by the circled part B in FIG. 5, as compared with that of other parts thereof. Consequently, the magnetic flux of the magnetic core at this place is saturated. This results in deterioration in the magnetic characteristics thereat.

SUMMARY OF THE INVENTION

It is therefore an object of the invention is to provide a thin film magnetic head that exhibits excellent magnetic characteristics. Another object of the invention is to provide a method of manufacturing such a thin film magnetic head.

In order to achieve the above object, according to the present invention, there is provided a thin film magnetic head, comprising:

a lower magnetic layer;

a non-magnetic layer, laminated on the lower magnetic layer;

a first upper magnetic layer, formed on the non-magnetic layer so as to form a magnetic core together with the lower magnetic layer and the non-magnetic layer, the first upper magnetic layer having a first saturation magnetic flux density and a first magnetostriction constant;

an insulation layer, formed on the non-magnetic layer;

a thin film coil, provided in the insulation layer; and a second upper magnetic layer, formed on the insulation layer so as to be at least above the thin film coil, the second upper magnetic layer having a second saturation magnetic flux density and a second magnetostriction constant, wherein the first saturation magnetic flux density is higher than the second saturation magnetic flux density, and the second magnetostriction constant is lower than the first magnetostriction constant.

According to the present invention, there is also provided a method of manufacturing a thin film magnetic head, comprising the steps of:

providing a lower magnetic layer;

laminating a non-magnetic layer on the lower magnetic layer;

forming a first upper magnetic layer on the non-magnetic layer while performing spattering process;

forming an insulation layer on the non-magnetic layer while providing a thin film coil therein; and forming a second upper magnetic layer on the insulation layer so as to be at least above the thin film coil, while performing plating process.

In the above configurations, the first upper magnetic layer placed in the vicinity of a magnetic gap of the magnetic core can be formed from a magnetic material exhibiting a relatively high saturation magnetic flux density. On the other hand, a second upper magnetic layer placed just above the thin film coil can be formed from a magnetic material exhibiting relatively low magnetostriction property. Thus, a favorable magnetic flux flow in the magnetic core can be ensured. Moreover, the magnetic core located at a place in the proximity of the magnetic gap can be formed with high dimension accuracy.

Therefore, the recording and reproducing of weak magnetic signals can be efficiently performed with high accuracy.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Hereinafter, one preferable embodiment of the invention is described in detail with reference to the accompanying drawings.

Figure 1:
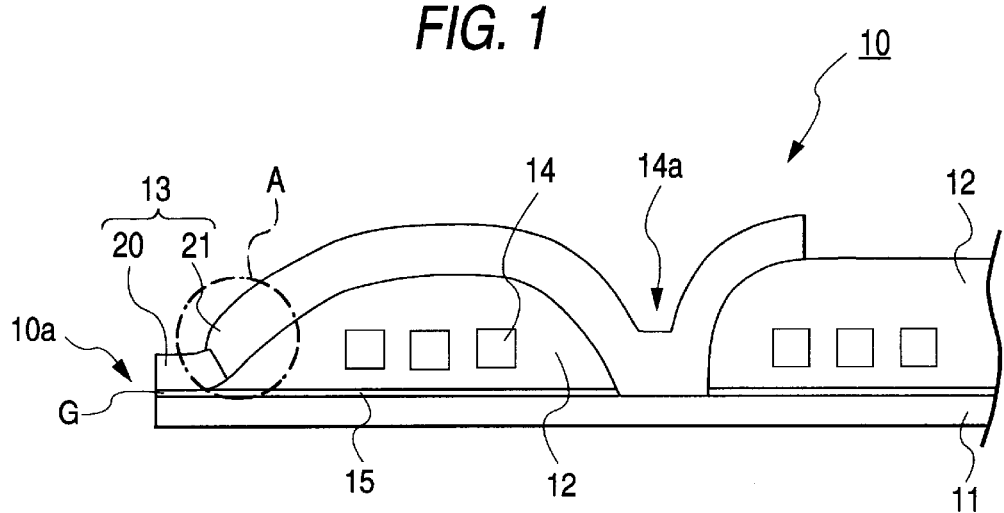
FIG. 1 is a schematic sectional view illustrating a sectional structure in a thin film magnetic head according to one embodiment of the invention.

As illustrated in FIG. 1, a thin film magnetic head 10 has a structure in which a lower magnetic layer 11, a non-magnetic layer 15, an insulating layer 12, and an upper magnetic layer 13 are subsequently laminated on a substrate (not shown). A coil 14 formed like thin film is provided in the insulating layer 12. The lower magnetic layer 11 and the upper magnetic layer 13 are connected to each other at a place corresponding to the winding center 14a of the coil 14, so as to constitute a magnetic core. A non-magnetic layer 15 is formed from, for example, a non-magnetic $Al_2O_3$ film so as to serve as a magnetic gap G formed on a head face 10a opposing to the magnetic recording medium.

Although FIG. 1 illustrates only a primary part of the thin film magnetic head 10, needless to say, the application of the invention is not limited to the thin film magnetic head 10 adapted to have the structure illustrated in FIG. 1. For example, the invention can be applied to a composite type magnetic head in which a magnetoresistive element is disposed between the lower magnetic layer 11 and the substrate and integrally combined with a reproduction-only magnetic head.

In the thin film magnetic head 10, the lower magnetic layer 11 is formed like a thin film from a magnetic material to be selected from a group consisting of CoZr, Fe—Ta—N, Fe—Zr—N, Fe—Al—N, and Fe—N, each of which has a saturation magnetic flux density that is equal to or more than 1.5 Tesla. This lower magnetic layer 11 is formed by using thin film forming techniques, such as a sputtering process.

The insulating layer 12 is formed by performing a high-temperature baking process on a photoresist (for instance, at a temperature of 250° C.), so as to incorporate the coil 14 therein. A part, which is located at a place corresponds to the winding center 14a of the coil 14, of the insulating layer 12 is removed. The lower magnetic layer 11 and the upper magnetic layer 13 are connected to each other at this place.

The upper magnetic layer 13 comprises a first magnetic layer 20, which is formed at a place located in the vicinity of the magnetic gap G from a magnetic material exhibiting a relatively high saturation magnetic flux density, and a second magnetic layer 21 that is formed at a place located just above the coil 14 from a magnetic material exhibiting relatively low magnetostriction property.

The first magnetic layer 20 is formed like a thin film from a magnetic material, such as CoZr, Fe—Ta—N, Fe—Zr—N, Fe—Al—N, or Fe—N, which has a saturation magnetic flux density $B_s$ that is equal to or more than 1.5 Tesla. This first magnetic layer 20 can be formed by using thin film forming techniques, such as a sputtering process.

The second magnetic layer 21 is formed like a thin film from a magnetic material, whose composition is such so that the layer 21 contains 80 wt % of Ni and 20 wt % of Fe. The second magnetic layer 21 is formed from such a material, so that the magnetostriction thereof can be set in such a manner as to meet the inequality: $\lambda < \pm 1 \times 10^{-5}$.

The thin film magnetic head 10 configured in the aforementioned manner has a structure in which the lower magnetic layer 11 and the upper magnetic layer 13 are laminated with the non-magnetic layer 15 in between to constitute the magnetic core, and the thin film coil 14 is wound around this magnetic core. That is, the thin film magnetic head 10 is what is called an inductive magnetic head.

The thin film magnetic head 10 is adapted so that the upper magnetic layer 13 comprises the first magnetic layer 20, which is located in the vicinity of the magnetic gap G, and the second magnetic layer 21, which is located just above the coil 14. Therefore, the thin film magnetic head 10 is advantageous not only in that the upper magnetic layer 13 can be easily formed with high accuracy in the vicinity of the magnetic gap G, which is important for the recording and reproducing of weak signals, and that the upper magnetic layer 13 can be formed in a slope portion (that is, a part A circled indicated by an in FIG. 1), which is formed by providing the coil 14 in the non-magnetic layer 12 in such a way as to have a uniform thickness.

Therefore, the thin film magnetic head 10 can reliably perform the recording and reproducing of weak magnetic signals with high precision so as to cope with demands for high recording density. Moreover, the magnetic head 10 can ensure a favorable magnetic flux flow in the magnetic core.

Practically, for example, it can be ensured that the saturation magnetic flux density $B_s$ of the upper magnetic layer in the vicinity of the magnetic gap G in the magnetic core is equal to or more than 1.5 Tesla. Further, it can be facilitated to set the film thickness of the upper magnetic layer 13 located just above the coil 14 at a value, which is equal to or more than 2 μm, in such a way as to be thicker than that of a part located in the vicinity of the magnetic gap G.

Furthermore, preferably, in the thin film magnetic head 10, the magnetic core is shaped in such a way as to satisfy the following inequality:

$$\frac{l1}{\mu 1 S1} < \frac{l2}{\mu 2 S2}$$

where l1, S1, and μ1 designate a magnetic path length, a permeability, and a magnetic-path cross-section of the first magnetic layer 20, and where l2, S2, and μ2 designate a magnetic path length, a permeability, and a magnetic-path cross-section of the second magnetic layer 21.

Next, a description is given hereinbelow to the case of manufacturing the upper magnetic layer 13 of the aforementioned thin film magnetic head 10.

Figure 2A:
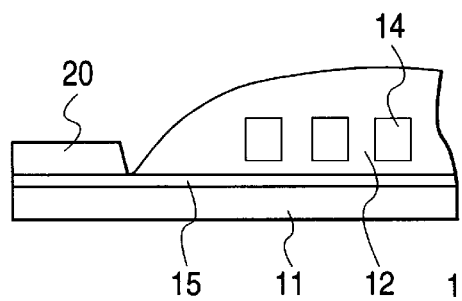
FIG. 2A is an enlarged sectional view illustrating a state in which a first magnetic layer is formed on a non-magnetic layer.
Figure 2B:
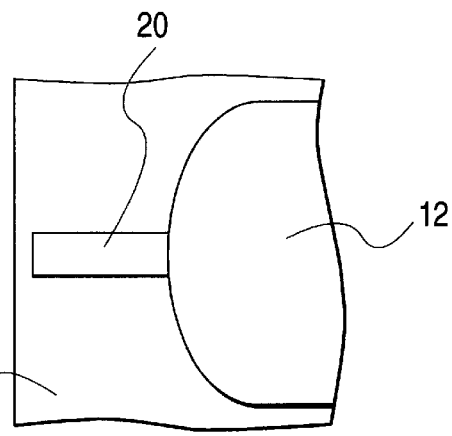
FIG. 2B is a plan view of FIG. 2A.

When the upper magnetic layer 13 is manufactured, first, the first magnetic layer 20 is formed on the insulating layer 12, which is formed so that the coil 14 is loaded thereinto, at a place, at which the magnetic gap G is formed, by performing a sputtering process as illustrated in FIGS. 2A and 2B.

At that time, a resist layer having an aperture corresponding to a desired shape of the first magnetic layer 20 is preliminarily formed on the insulating layer 12. Then, the first magnetic layer 20 is formed by performing a sputtering process. Thereafter, the resist layer is peeled off therefrom. Thus, the first magnetic layer 20 is formed by performing what is called a lift-off method in such a way as to have a predetermined shape.

Incidentally, although the first magnetic layer 20 is formed in this embodiment after the insulating layer 12 is formed, this embodiment may be adapted so that the first magnetic layer 20 is formed after the non-magnetic layer 5 is formed, and thereafter, the insulating layer 12 is formed.

Figure 3A:
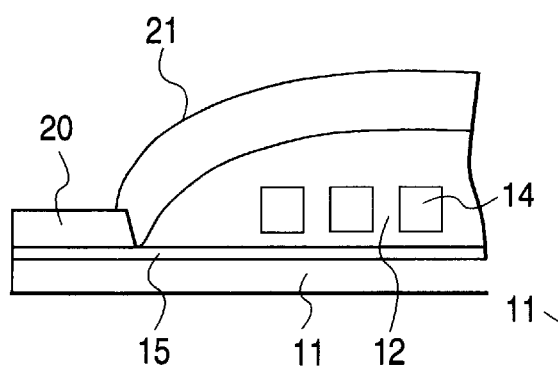
FIG. 3A is an enlarged sectional view illustrating a state in which a second magnetic layer is formed on the non-magnetic layer.
Figure 3B:
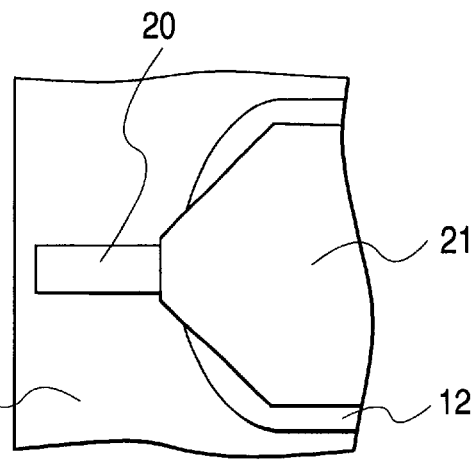
FIG. 3B is a plan view of FIG. 3A

Subsequently, as illustrated in FIGS. 3A and 3B, the second magnetic layer 21 is formed at a place located just above the coil 14 by performing a plating process in such a way as to be in contact with the first magnetic layer 20.

Figure 4A:
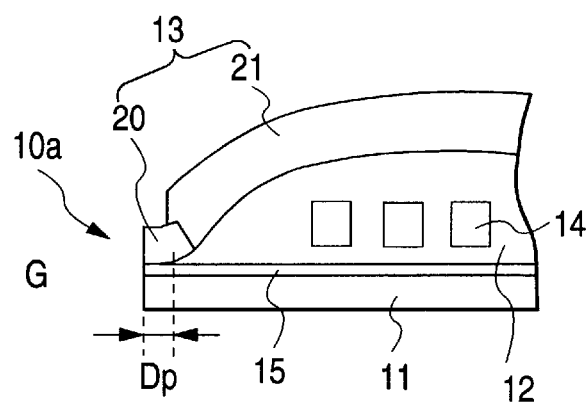
FIG. 4A is an enlarged sectional view illustrating a state in which polishing processing is performed on a head face.
Figure 4B:
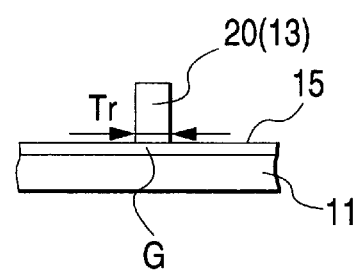
FIG. 4B is a side view of a head face shown in FIG. 4A.
Figure 5:
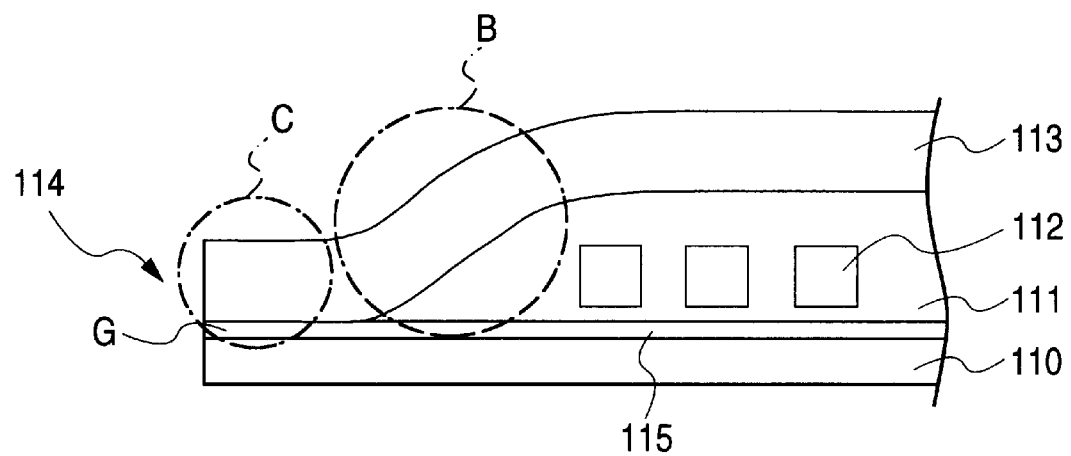
FIG. 5 is a schematic sectional view illustrating a primary part of a related thin film magnetic head.

Then, as illustrated in FIG. 4A, polishing processing is performed to form the head face 10$a$ so that the magnetic gap G is equal to a predetermined gap depth $D_p$. At the head face 10$a$, as illustrated in FIG. 4B, the width of a part of the upper magnetic layer 13, which is in contact with the gap G, is equal to a track width $T_r$.

By manufacturing the upper magnetic layer 13 in the aforementioned manner, the first magnetic layer 20 can be formed with high dimension accuracy in such a way as to have a thin film thickness. The second magnetic layer 21 can be formed at a step portion indicated by a part A circled in FIG. 1 in such a manner as to have a film thickness that is larger than the thickness of the first magnetic layer 20.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A thin film magnetic head, comprising:
   a lower magnetic layer;
   a non-magnetic layer, laminated on the lower magnetic layer;
   a first upper magnetic layer, formed on the non-magnetic layer so as to form a magnetic core together with the lower magnetic layer and the non-magnetic layer, the first upper magnetic layer having a first saturation magnetic flux density and a first magnetostriction constant;
   an insulation layer, formed on the non-magnetic layer;
   a thin film coil, provided in the insulation layer; and
   a second upper magnetic layer, formed directly on the insulation layer so as to be at least above the thin film coil, the second upper magnetic layer having a second saturation magnetic flux density and a second magnetostriction constant,
   wherein the first saturation magnetic flux density is higher than the second saturation magnetic flux density, and the second magnetostriction constant is lower than the first magnetostriction constant,
   wherein the magnetic core has a head face which slides a magnetic recording medium;
   wherein a first end portion of the second upper magnetic layer is retracted from the head face; and
   wherein the first upper magnetic layer is extended from the first end portion of the second upper magnetic layer to the head face.

2. The magnetic head as set forth in claim 1, wherein the first upper magnetic layer and the second upper magnetic layer are so formed as to following inequality:

$$\frac{l1}{\mu 1 S1} < \frac{l2}{\mu 2 S2}$$

where I1, S1, and $\mu 1$ represent a magnetic path length, a permeability, and a magnetic-path cross-section of the first upper magnetic layer, respectively, and where I2, S2, and $\mu 2$ represent a magnetic path length, a permeability, and a magnetic-path cross-section of the second upper magnetic layer.

3. The magnetic head as set forth in claim 1, wherein the first upper magnetic layer is made of at least one material selected from a group including CoZr, Fe—Ta—N, Fe—Zr—N, Fe—Al—N and Fe—N, such that the first saturation magnetic flux density is 1.5 Tesla or more.

4. The magnetic head as set forth in claim 1, wherein second magnetostriction constant is more than $-1 \times 10^{-5}$ and less than $+1 \times 10^{-5}$.

5. The magnetic head as set forth in claim 1, wherein the first upper magnetic layer is made of at least one material selected from CoZr, Fe—Ta—N, Fe—Zr—N or Fe—Al—N.

6. The magnetic head as set forth in claim 1, wherein the first upper magnetic layer is made of at least Fe—N.

7. A thin film magnetic head, comprising:
   a lower magnetic layer;
   a non-magnetic layer, laminated on the lower magnetic layer;
   a first upper magnetic layer, formed on the non-magnetic layer so as to form a magnetic core together with the lower magnetic layer and the non-magnetic layer, the first upper magnetic layer having a first saturation magnetic flux density and a first magnetostriction constant, and the first upper magnetic layer formed by a sputtering process;
   an insulation layer, formed on the non-magnetic layer;
   a thin film coil, provided in the insulation layer; and
   a second upper magnetic layer, formed on the insulation layer so as to be at least above the thin film coil, the second upper magnetic layer having a second saturation magnetic flux density and a second magnetostriction constant, and the second upper magnetic layer formed by a plating process,
   wherein the first saturation magnetic flux density is higher than the second saturation magnetic flux density, and the second magnetostriction constant is lower than the first magnetostriction constant,
   wherein the magnetic core has a head face which slides a magnetic recording medium,
   wherein the first upper magnetic layer includes a first end portion which constructs as part of the head face, and a second end portion which is opposed to the first end portion, and
   wherein the second upper magnetic layer is extended from the second end portion of the first upper magnetic layer so as to be away from the head face.

8. The magnetic head as set forth in claim 7, wherein the first upper magnetic layer and the second upper magnetic layer are so formed as to following inequality:

$$\frac{l1}{\mu 1 S1} < \frac{l2}{\mu 2 S2}$$

where l1, S1, and $\mu 1$ represent a magnetic path length, a permeability, and a magnetic-path cross-section of the first upper magnetic layer, respectively, and where l2, S2, and $\mu 2$ represent a magnetic path length, a permeability, and a magnetic-path cross-section of the second upper magnetic layer.

9. The magnetic head as set forth in claim 7, wherein the second magnetostriction constant is more than $-1 \times 10^{-5}$ and less than $+1 \times 10^{-5}$.

10. The magnetic head as set forth in claim 7, wherein the second upper magnetic layer is formed on a slope portion.

* * * * *